(12) United States Patent
Itoh et al.

(10) Patent No.: US 6,532,987 B1
(45) Date of Patent: Mar. 18, 2003

(54) RELIEF VALVE

(75) Inventors: Katsuhiko Itoh, Saitama (JP); Mitsuru Saito, Saitama (JP); Masataka Eguchi, Saitama (JP); Hideyuki Tawara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,004

(22) Filed: Feb. 11, 2000

(30) Foreign Application Priority Data

Feb. 12, 1999 (JP) ............................................ 11-034688

(51) Int. Cl.⁷ ............................................... F16K 21/10
(52) U.S. Cl. ................................. 137/514.5; 137/514.3; 137/543.23
(58) Field of Search .............................. 137/514, 514.5, 137/514.3, 543.23

(56) References Cited

U.S. PATENT DOCUMENTS

| | | | |
|---|---|---|---|
| 843,988 A | * 2/1907 | Barton | 137/514.3 |
| 2,261,886 A | * 11/1941 | Kowacz | 137/514.3 |
| 2,941,629 A | * 6/1960 | Rohacs | 137/514.3 X |
| 3,680,587 A | * 8/1972 | Herscovici | 137/514.3 |
| 4,112,959 A | * 9/1978 | Jaekel | 137/514 X |
| 4,194,527 A | * 3/1980 | Schonwald et al. | 137/514 X |
| 4,842,198 A | * 6/1989 | Chang | 137/514.3 X |
| 5,129,419 A | * 7/1992 | Stapleton | 137/514.3 |
| 5,404,903 A | * 4/1995 | Anderson et al. | 137/514.3 |
| 5,669,356 A | * 9/1997 | Wall et al. | 137/514.3 X |
| 5,931,191 A | * 8/1999 | Taube et al. | 137/514.3 X |
| 6,142,176 A | * 11/2000 | Sagawa et al. | 137/514.5 |

FOREIGN PATENT DOCUMENTS

| | | | | |
|---|---|---|---|---|
| GB | 705561 | * | 3/1954 | 137/514.3 |
| IT | 592721 | * | 5/1959 | 137/514.3 |
| SU | 271209 | * | 5/1970 | 137/514.3 |
| SU | 0615304 | * | 7/1978 | 137/514.3 |

* cited by examiner

Primary Examiner—John Rivell
(74) Attorney, Agent, or Firm—Birch, Stewart, Kolasch & Birch, LLP

(57) ABSTRACT

A relief valve having a cylindrical case with one side thereof communicated with a fluid-pressure source, a relief piston accommodated in the cylindrical case and slidable therein, a return spring for pressing the relief piston against the fluid-pressure source, a damper chamber provided on a rear-surface side of the relief piston, said damper chamber communicated with the fluid-pressure source through an orifice of the relief piston and used for displaying a buffer action against an operation of the relief piston, and a relief hole bored through a wall of the cylindrical case, the relief hole communicated with the fluid-pressure source when the relief piston retreats due to an increase in pressure generated by the fluid-pressure source.

10 Claims, 2 Drawing Sheets

RELIEF VALVE

BACKGROUND OF THE INVENTION

1. Field of the Invention

The present invention relates to a relief valve, more particularly, to a relief valve that allows a valve seating sound to be reduced and the design of a return spring to be made simple.

2. Background Art

As shown in FIG. 3, the conventional relief valve 01 includes a cylindrical case 02 with one side thereof (or the left side shown in the figure) communicated with a fluid pressure source; a relief piston 03 accommodated in the cylindrical case 02 in such a way that the piston 03 can be sled with a high degree of freedom; a return spring 04 for pressing the relief piston 03 against the fluid-pressure source; and a stopper 015 for seating the relief piston 03.

Relief holes 05 are bored through walls of the cylindrical case 02. When the relief piston 03 retreats due to an increase in pressure generated by the fluid-pressure source, the relief holes 05 are communicated with the fluid-pressure source, allowing the relief valve 01 to get rid of the increase in pressure generated by the fluid-pressure source. Reference numeral 013 denotes a guide cover for orienting an escaping pressed fluid in one direction.

Due to the conventional relief valve 01 having the configuration described above, after the relief valve 01 gets rid of an increase in pressure generated by the fluid-pressure source, the relief piston 03 returns from a retreat position to a seat position, generating a seating sound due to a collision with the stopper 015. In some cases, this seating sound results in noise.

In addition, because the return spring 04 is accommodated in a small space inside the cylindrical case 02, the setting of an anticipated relief pressure and the reduction of the valve seating sound are not achieved readily.

SUMMARY OF THE INVENTION

It is thus an object of the present invention to provide a relief valve capable of reducing a seating sound of the relief piston (or the relief valve element).

A further object of the present invention is to provide a relief valve where seating of a relief piston is achieved with reduced noise generation.

Another object of the present invention is to provide a relief valve where the return spring thereof may be designed with ease.

These and other objects of the present invention are solved by providing a relief valve having a cylindrical case with one side thereof communicated with a fluid-pressure source; a relief piston accommodated in the cylindrical case in such a way that the piston can be sled with a high degree of freedom; and a return spring for pressing the relief piston against the fluid-pressure source, wherein a relief hole bored through a wall of the cylindrical case is communicated with the fluid-pressure source when the relief piston retreats due to an increase in pressure generated by the fluid-pressure source, and wherein the relief-valve includes a damper chamber, provided on a rear-surface side of the relief piston, communicated with the fluid-pressure source through an orifice and used for displaying a buffer action against a movement of the relief piston.

The configuration of the present invention includes a damper chamber, provided on a rear-surface side of the relief piston, communicated with the fluid-pressure source through an orifice and used for displaying a buffer action against an operation of the relief piston. As a result, when the relief piston returns from a retreat position to a seat position after the relief valve relieves an increase in pressure generated by the fluid-pressure source, the return movement is slowed down, reducing the magnitude of a seating sound generated by a collision of the piston with the stopper, hence, causing no noise.

In addition, since part of a spring load of the return spring holding the relief valve at the seat position is borne by the buffer action of the damper chamber, the spring load of the return spring can be assumed to have a small value in comparison with the conventional relief valve. Thus, a small return spring can be employed. As a result, the design of the return spring accommodated in a small space inside the cylindrical case can be made simple.

Moreover, since the retreat and return movements of the relief piston-are slowed down, variations in pressure generated by the liquid-pressure source decrease, thus, smoothing the operation of equipment, such as various kinds of hydraulic equipment.

Furthermore, the relief piston includes a central separation wall and first and second sleeves created on both sides of the central separation wall, thereby sandwiching the central separation wall. The first sleeve is accommodated at one end of the cylindrical case in such a way that the first sleeve can be sled with a high degree of freedom, and the second sleeve is accommodated at the other end of the cylindrical case. An orifice is bored through the separation wall and a sleeve hole is bored through the first sleeve. The damper chamber comprises the separation wall, the second sleeve and a stationary damper piston fitted into the second sleeve in such a way that the damper piston can be sled with a high degree of freedom inside the second sleeve relatively to the second sleeve.

As a result, in the relief piston, the separation wall and the first sleeve having a sleeve hole bored through it function as an element of the relieve valve whereas, at the same time, the separation wall with an orifice bored through it and the second sleeve are utilized as elements constituting the damper chamber. Thus, the damper chamber can be formed with ease and the structure of the damper chamber can be made simple.

In addition, the relief piston includes a central separation wall and first and second sleeves created on both sides of the central separation wall, thereby sandwiching the central separation wall. The first sleeve is accommodated at one end of the cylindrical case in such a way that the first sleeve can be sled with a high degree of freedom, and the second sleeve is accommodated at the other end of the cylindrical case. An orifice is bored through the separation wall and a sleeve hole is bored through the first sleeve. The damper chamber includes the separation wall, the second sleeve and a stationary damper-bottom cylinder engaged with the second sleeve, such that the damper-bottom cylinder can be sled with a high degree of freedom inside the second sleeve relative to the second sleeve.

As a result, in the relief piston, the separation wall and the first sleeve having a sleeve hole bored through it function as an element of the relieve valve whereas, at the same time, the separation wall with an orifice bored through it and the second sleeve are utilized as elements constituting the damper chamber. Thus, the damper chamber can be formed with ease and the structure of the damper chamber can be made simple.

Moreover, a damper-bottom cylinder is used in the creation of a damper chamber as a member which serves as a partner of the second sleeve and is engaged with the second sleeve in such a way that the damper-bottom cylinder can be sled with a high degree of freedom inside the second sleeve relatively to the second sleeve. Thus, the damper chamber can be created more easily and the weight of the relieve valve can be reduced.

Furthermore, a stair is created between the ends of the cylindrical case, and an outermost-circumferential flange of the separation wall of the relief piston is seated on the stair.

As a result, since a seat surface of the relief piston can be created by utilizing the stair formed by virtue of a difference in internal diameter between the ends of the cylindrical case, which is created to have a relatively large diameter and to accommodate the return piston, the seat surface can be formed with ease.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
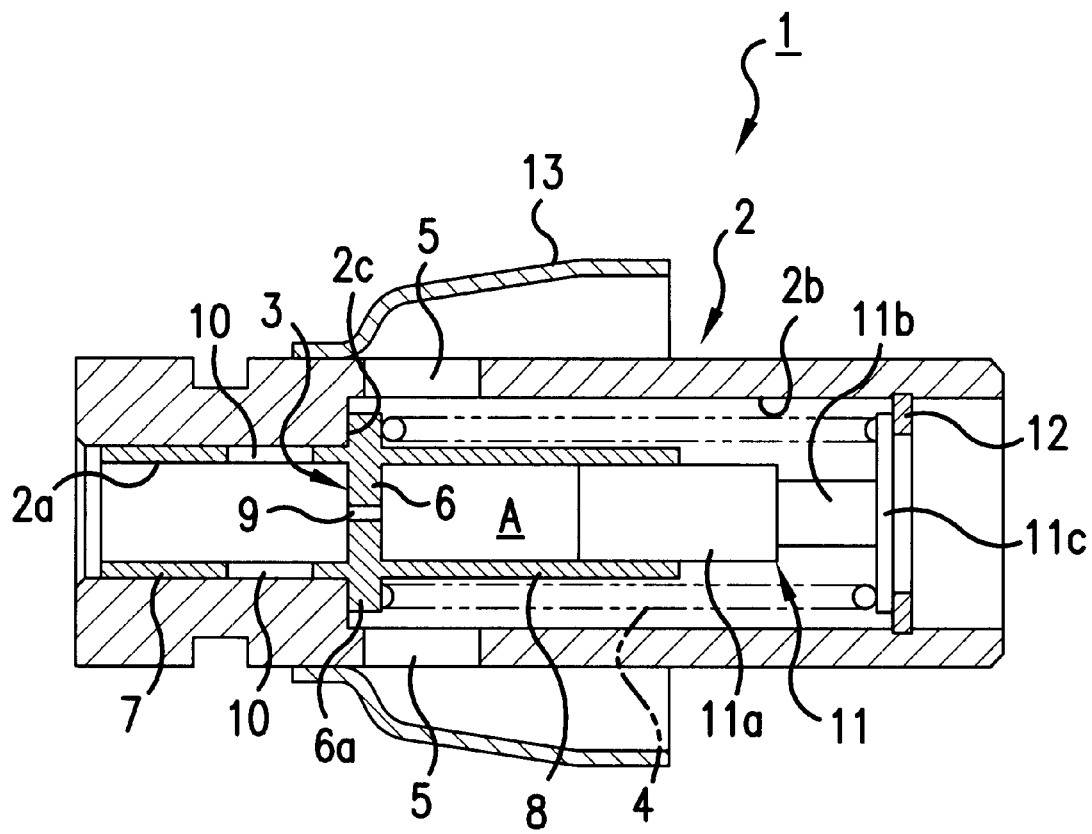
FIG. 1 is a diagram showing a longitudinal cross section of a relief valve implemented by a first embodiment of the present invention as in claim 1, 2 and 4.

FIG. 1 is a diagram showing the longitudinal cross section of a relief valve implemented by the first embodiment. As shown in FIG. 1, the relief valve 1 implemented by the first embodiment includes a cylindrical case 2 with one side thereof (that is, the left side of FIG. 1) communicated with a fluid-pressure source, not shown in the figure. A relief piston 3 is accommodated in the cylindrical case 2 in such a way that the piston 3 can be sled with a high degree of freedom. Furthermore, a return spring 4 for pressing the relief piton 3 against the fluid-pressure source is included.

A plurality of relief holes 5 are bored through a wall of the cylindrical case 2 and are arranged at equal intervals in the circumferential direction. When the relief piston 3 retreats, that is, moves in the right direction in FIG. 1 due to an increase in pressure generated by the fluid-pressure source, the relief holes 5 are communicated with the fluid-pressure source through a plurality of sleeve holes 10 to be described later.

The relief valve 1 includes a damper chamber A provided on a rear-surface side of the relief piston 3. Communicated with the fluid-pressure source through an orifice 9 to be described later, the damper chamber A displays a buffer action against a movement of the relief piston 3.

The relief piston 3 further includes a central separation wall 6 and first and second sleeves 7 and 8 created on both sides of the central separation wall 6, thereby sandwiching the central separation wall 6. The first sleeve 7 is accommodated in a sleeve accommodation hole 2a formed at one end of the cylindrical case 2 in such a way that the first sleeve 7 can be sled with a high degree of freedom. The sleeve holes 10 cited above are bored through the first sleeve 7, being arranged at equal intervals in the circumferential direction at positions relatively close to the separation wall 6. The sleeve accommodation hole 2a is a link to the liquid-pressure source.

The second sleeve 8 is accommodated in a spring accommodation hole 2b formed at the other end of the cylindrical case 2 in such a way that a space large enough for accommodation of the return spring 4 is preserved. The spring accommodation hole 2b has a diameter larger than the sleeve accommodation hole 2a. A stair 2c is created to serve as a border between the spring accommodation hole 2b and the sleeve accommodation hole 2a.

The orifice 9 is bored through the separation wall 6 of the relief piston 3. An outermost circumferential flange 6a of the separation wall 6 is formed on the outermost circumference of the orifice 9. At normal times, the outermost circumferential flange 6a of the separation wall 6 is pressed by the return spring 4 seated on the stair 2c as described above. In this way, the stair 2c serves as a seat for the relief piston 3, which functions as a member of the relief valve 1.

A piston body 11a of a damper piston 11, fixed in a stationary state on the open side on the right-hand side of FIG. 1, is fitted into the second sleeve 8 in such a way that the piston body 11a can be sled with a high degree of freedom inside the second sleeve 8 relatively to the second sleeve 8. In this way, the damper chamber A comprises the separation wall 6 of the relief piston 3 having the orifice 9 bored through the wall 6, the second sleeve 8 of the relief piston 3 and the piston body 11a of the damper piston 11.

The damper piston 11 includes the piston body 11a described above, a leg 11b with a diameter smaller than the piston body 11a and a circular mounting plate 11c with a diameter larger than the piston body 11a. These elements are assembled to form a single component. The mounting plate 11c is brought into contact with a cisclip 12 which is engaged with a groove formed at a place in close proximity to the other end of the cylindrical case 2. The return spring 4 is provided in a contracted state between the mounting plate 11c and the outermost circumferential flange 6a of the separation wall 6, fixing the damper piston 11 inside the cylindrical case 2 in a stationary state.

Therefore, when a pressure generated by the liquid pressure source increases, causing the pressed liquid inside the sleeve accommodation hole 2a of the cylindrical case 2 to push the separation wall 6 of the relief piston 3 in the right direction in FIG. 1 against a resisting force of the return spring 4, the outermost circumference flange 6a of the separation wall 6 departs from the stair 2c, causing the relief piston 3 to retreat in the same direction.

At that time, since some of the pressed liquid leaks to the damper chamber A by way of the orifice 9 of the separation wall 6, the retreat movement of the relief piston 3 is inhibited equal to the rate the pressed liquid is leaking to the damper chamber A. Thus, variations in pressure on the liquid-pressure-source side are reduced.

Therefore, the damper chamber A serves as a resistance to the retreat movement of the relief piston 3. In other words, since the damper chamber A bears part of a relief pressure of the relief valve 1, the spring load of the return spring 4 is reduced by an amount corresponding to the part of the relief pressure borne by the damper chamber A. Thus, a small return spring 4 can be used. As a result, the design of the return spring 4, accommodated in a small space of the cylindrical case 2, is simpler.

As the pressure generated by the liquid pressure source further increases, causing the pressed liquid inside the sleeve accommodation hole 2a of the cylindrical case 2 to push the separation wall 6 of the relief piston 3 in the right direction further against the resisting force of the return spring 4, the sleeve holes 10 of the first sleeve 7 arrive at the stair 2c, allowing the pressed fluid to flow into the spring accommodation hole 2b of the cylindrical case 2 and to further flow out from the relief holes 5 of the cylindrical case 2 and returns to a reserve tank not shown in the figure. Thus, since the relief holes 5 are communicated with the liquid-pressure source, an increase in pressure generated by the liquid-pressure source can be avoided. It should be noted that the pressed liquid flowing from the relief holes 5 is discharged in a predetermined direction lead by a guide cover 13.

As the pressure of the liquid-pressure source stops increasing, the return spring 4 presses the outermost circumferential flange 6a of the separation wall 6, restoring the relief piston 3 from the retreat position to the seat position on the stair 2c.

Since the volume of the damper chamber A increases in the process of restoring the relief piston 3, the pressure in the damper chamber A becomes negative. The negative pressure generates a force drawing back the relief piston 3 in the retreat direction, a slowing down the return movement of the relief piston 3 from the retreat position to the seat position being caused by the spring force of the return spring 4.

Since the damper effect or the buffer action of the damper chamber A slows down the return movement of the relief piston 3 from the retreat position to the seat position in this way, it is possible to reduce the seating sound of the relief piston 3 which is generated when the outermost circumferential flange 6a of the separation wall 6 is brought into contact with the stair 2c. As a result, no noise is generated.

The embodiment has a configuration as described above, and displays the following effects.

The buffer action of the damper chamber A slows down the retreat movement and the return movement (or the seating movement) of the relief piston 3. Thus, variations in pressure in the liquid-pressure source are reduced. As a result, the operation of equipment, such as various kinds of hydraulic equipment, is smoothed.

The relief piston 3 comprises the central separation wall 6 the and first and second sleeves 7 and 8 created on both sides of the central separation wall 6, thereby sandwiching the central separation wall 6. The first sleeve 7 is accommodated at one end of the cylindrical case 2 in such a way that the first sleeve 7 can be sled with a high degree of freedom. The second sleeve 8 is accommodated at the other end of the cylindrical case 2. The orifice 9 is bored through the separation wall 6 and the sleeve holes 10 are bored through the first sleeve 7. The damper chamber A includes the separation wall 6, the second sleeve 8 and the stationary damper piston 11 fitted into the second sleeve 8 in such a way that the damper piston 11 can be sled with a high degree of freedom inside the second sleeve 8.

As a result, in the relief piston 3, the separation wall 6 and the first sleeve 7 having the sleeve holes 10 bored through it function as an element of the relieve valve 1 whereas, at the same time, the separation wall 6 with an orifice 9 bored through it and the second sleeve 8 are utilized as elements constituting the damper chamber A. Thus, the damper chamber A can be formed with ease and the structure of the damper chamber A can be made simple.

In addition, the stair 2c is created between the sleeve accommodation hole 2a on one side of the cylindrical case 2 and the spring accommodation hole 2b on the other side of the cylindrical case 2, and the outermost circumferential flange 6a of the separation wall 6 of the relief piston 3 is seated on the stair 2c.

Therefore, since a seat surface of the relief piston 3 can be created by utilizing the stair 2c formed by virtue of a difference in internal diameter between the sleeve accommodation hole 2a and the spring accommodation hole 2b which is created to have a relatively large diameter and to accommodate the return spring 4, the seat surface can be formed with ease.

Figure 2:
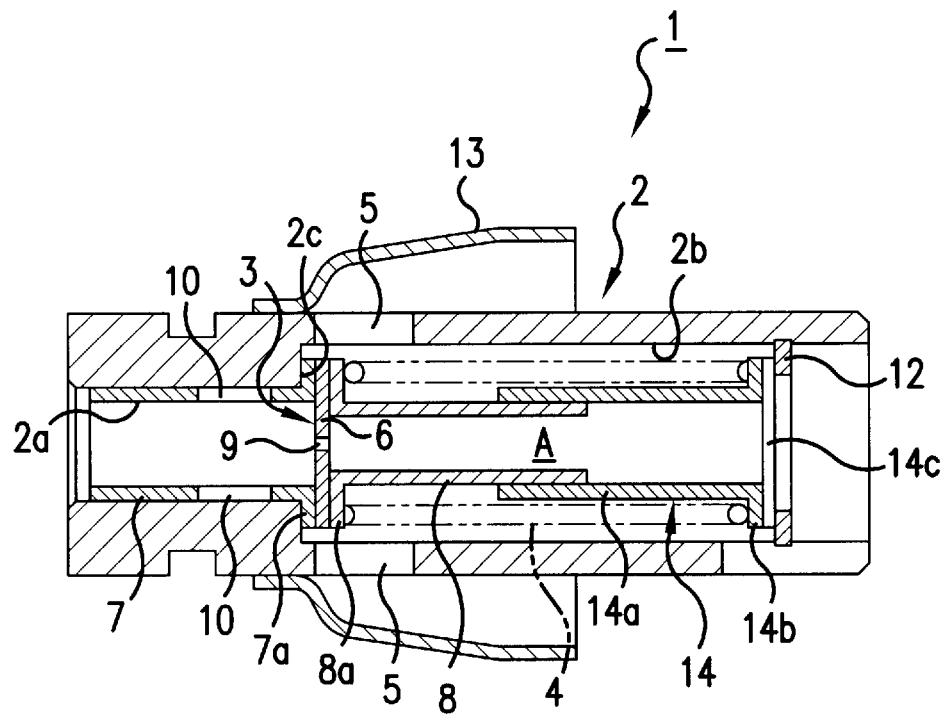
FIG. 2 is a diagram showing a longitudinal cross section of a relief valve implemented by a second embodiment of the present invention as in claim 3.
Figure 3:
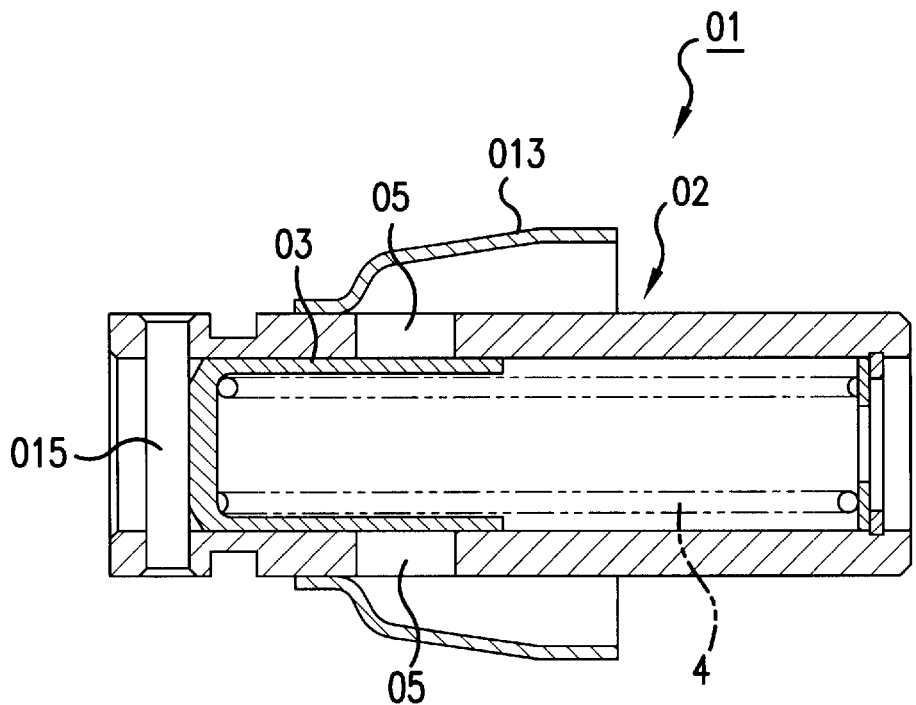
FIG. 3 is a diagram showing the conventional relief valve.

FIG. 2 is a diagram showing the longitudinal cross section of the relief valve implemented by the second embodiment. In the second embodiment, a damper-bottom cylinder 14 is employed as a substitute for the damper piston 11 forming the damper chamber A in the first embodiment. The damper-bottom cylinder 14 is engaged with the second sleeve 8 of the relief piston 3 in such a way that the damper-bottom cylinder 14 can be sled with a high degree of freedom.

As shown in FIG. 2, the damper-bottom cylinder 14 includes a cylindrical body 14a having a flange 14b and a bottom plate 14c. The cylindrical body 14a is engaged with the outer side of the second sleeve 8 in such a way that the cylindrical body 14a can be sled with a high degree of freedom. The bottom plate 14c is created separately from the cylindrical body 14a, and is fixed to the cylindrical body 14a by screws or welding to form a single assembly. However, the bottom plate 14c can also be created jointly with the cylindrical body 14a to form a single assembly from the beginning.

In addition, in the case of the second embodiment, the second sleeve 8, the separation wall 6 and the first sleeve 7 of the relief piston 3 are created as separate components which are then fixed to each other to form a single assembly by screws or welding. It should be noted that the first and second sleeves 7 and 8 have flanges 7a and 8a, respectively, which are fixed to the separation wall 6 by the means described above to form a single assembly. As a result, the separation wall 6 and the first sleeve 7 of the relief piston 3 form a single assembly.

The second sleeve 8 has a diameter smaller than that of the first sleeve 7. The cylindrical body 14a of the damper-bottom cylinder 14 is engaged with the outer side of the second sleeve 8 with the smaller diameter. It should be noted that the second sleeve 8 can be designed to have a diameter equal to that of the first sleeve 7. In this case, the cylindrical body 14a is engaged with the inner side of the second sleeve 8.

The bottom plate 14c of the damper-bottom cylinder 14 is brought into contact with a cisclip 12 which is engaged with a groove formed at a place in close proximity to the other end of the cylindrical case 2. The return spring 4 is provided in a contracted state between the flange 14b of the damper-bottom cylinder 14 and the flange 8a of the second sleeve 8 of the relief piston 3, fixing the damper-bottom cylinder 14 inside the cylindrical case 2 in a stationary state.

The second embodiment is different from the first embodiment as described above. However, because the rest is the same, its detailed description is not repeated for brevity.

The second embodiment has a configuration as described above, and displays the following effects.

The damper-bottom cylinder 14 is used in the creation of the damper chamber A as a member which serves as a partner of the second sleeve 8, and is engaged with the second sleeve 8 in such a way that the damper-bottom cylinder 14 can be sled with a high degree of freedom inside the second sleeve 8. Thus, the damper chamber A can be created more easily and the weight of the relieve valve 1 can be reduced in comparison with the first embodiment employing the damper piston 11.

The relief valve 1 implemented by the first or second embodiment can be used by directly incorporating the valve 1 inside an oil pump of an internal combustion engine. The relief valve 1 can also be used in a variety of other applications where reduction of a valve seating sound and the size of the relief valve 1 are desirable.

What is claimed is:

1. A relief valve, comprising:
   a cylindrical case with one side thereof communicated with a fluid-pressure source;
   a relief piston accommodated in said cylindrical case and slidable therein, said relief piston including a central separation wall and first and second sleeves positioned on both sides of said central separation wall, whereby said first and second sleeves sandwich said central separation wall therebetween;
   a return spring for pressing said relief piston against said fluid-pressure source;
   a damper bottom cylinder mounted to said cylindrical case, said second sleeve slidingly engaged with said damper bottom cylinder;
   a damper chamber provided on a rear-surface side of said relief piston, said damper chamber communicated with said fluid-pressure source through an orifice of said relief piston and used for displaying a buffering action against an operation of said relief piston, wherein said damper chamber is formed by said damper bottom-cylinder, said central separation wall and said second sleeve; and
   a relief hole bored through a wall of said cylindrical case, said relief hole communicated with said fluid-pressure source when said relief piston retreats due to an increase in pressure generated by said fluid-pressure source, wherein said relief piston includes at least one hole defined therein, said hole defined along a lateral surface of said relief piston.

2. The relief valve according to claim 1, wherein said first sleeve is accommodated at one end of said cylindrical case in a first cylindrical section of said cylindrical case and said second sleeve is accommodated at the other end of said cylindrical case in a second cylindrical section of said cylindrical case.

3. The relief valve according to claim 1, wherein said central separation wall includes an orifice bored therethrough.

4. The relief valve according to claim 2, wherein said central separation wall includes a flange member extending beyond an outside surface of said first and second sleeves.

5. The relief valve according to claim 4, wherein said first cylindrical section has a circumference less than said second cylindrical section, said first and second cylindrical sections being contiguous and forming a stepped tubular through section, wherein a stair member is formed where said first and second cylindrical sections abut.

6. A relief valve, comprising:
   a case being in communication with a pressure supplying source;
   a moveable relief piston accommodated in said case, said moveable relief piston including a central separation wall and first and second sleeves created on both sides of said central separation wall, whereby said first and second sleeves sandwich said central separation wall therebetween;
   an elastomer member for pressing said movable relief piston against said pressure supplying source;
   a damper bottom cylinder mounted to said cylindrical case, said second sleeve slidingly engaged within said damper bottom cylinder;
   a damper chamber provided on a rear-surface side of said moveable relief piston, said damper chamber communicated with said pressure supplying source through an orifice of said moveable relief piston and said damper chamber being formed by said damper bottom-cylinder, said central separation wall and said second sleeve; and
   a relief hole bored through a wall of said case, said relief hole communicated with said pressure supplying source when said relief piston retreats due to an increase in pressure generated by said pressure supplying source, wherein said moveable relief piston includes at least one hole defined therein, said hole defined along a lateral surface of said moveable relief piston.

7. The relief valve according to claim 6, wherein said first sleeve is accommodated at one end of said case in a first cylindrical section of said case and said second sleeve is accommodated at another end of said case in a second cylindrical section of said case.

8. The relief valve according to claim 6, wherein said central separation wall includes said orifice bored therethrough.

9. The relief valve according to claim 7, wherein said central separation wall includes a flange member extending beyond an outside surface of said first and second sleeves.

10. The relief valve according to claim 9, wherein said first cylindrical section has a circumference less than said second cylindrical section, said first and second cylindrical sections being contiguous and forming a stepped tubular through section, wherein a stair member is formed where said first and second cylindrical sections abut.

* * * * *